US007432461B2

(12) United States Patent
See

(10) Patent No.: US 7,432,461 B2
(45) Date of Patent: Oct. 7, 2008

(54) REPOSITIONABLE USER INPUT DEVICE

(75) Inventor: Stephine Mak Pui See, Tai Po (HK)

(73) Assignee: Vtech Electronics, Hong Kong (HK)

( * ) Notice: Subject to any disclaimer, the term of this patent is extended or adjusted under 35 U.S.C. 154(b) by 166 days.

(21) Appl. No.: 11/436,338

(22) Filed: May 18, 2006

(65) Prior Publication Data

US 2007/0054736 A1    Mar. 8, 2007

Related U.S. Application Data

(60) Provisional application No. 60/682,154, filed on May 18, 2005.

(51) Int. Cl.
*H01H 9/20* (2006.01)

(52) U.S. Cl. .............. 200/50.33; 200/50.36; 273/148 B
(58) Field of Classification Search .............. 200/43.16, 200/50.33, 50.35, 50.36, 5 B, 5 E; 273/148 B
See application file for complete search history.

(56) References Cited

U.S. PATENT DOCUMENTS

| 5,781,180 | A | * | 7/1998 | Couch et al. | 273/148 B |
| 5,785,317 | A | * | 7/1998 | Sasaki | 273/148 B |
| 5,960,941 | A | * | 10/1999 | Castonguay et al. | 200/308 |
| 6,563,063 | B1 | * | 5/2003 | Moore | 200/50.33 |

* cited by examiner

*Primary Examiner*—Edwin A. León
(74) *Attorney, Agent, or Firm*—Greenberg Traurig, LLP

(57) ABSTRACT

An apparatus, such as a handheld electronic learning system, is provided with at least one multi-function, repositionable controller assembly. The controller assembly includes a first user input device, such as a joystick, and a second user input device, such as a pushbutton switch. The controller assembly, carried by the housing of the apparatus, is rotatable between a first position and a second position. When the controller assembly is in the first position, they joystick is accessible on the exterior surface of the apparatus, while the pushbutton switch is concealed within the housing and inhibited from use. When the controller is rotated to the second position, the pushbutton switch is accessible on the exterior surface of the apparatus, while the joystick is concealed within the housing and inhibited from use. The inclusion of two such multi-function, repositionable controller assemblies, on opposing sides of the apparatus, allows the apparatus to be rapidly configured by the user for left-handed or right-handed operation.

13 Claims, 4 Drawing Sheets

REPOSITIONABLE USER INPUT DEVICE

BACKGROUND OF THE INVENTION

1. Field of the Invention

The present invention relates to user input devices, such as joysticks and pushbutton switches, for use in electronic computing devices, such as electronic learning systems, game systems, and computers.

2. The Prior Art

It is common for computing devices, and in particular portable computing devices such as game systems and electronic learning systems, to include a number of user input devices, including joysticks and pushbutton switches. In many such systems, two or more different user input devices are positioned at fixed positions of the housing of the device, such as on opposing sides of the device's video display. For example, the NINTENDO DS portable video game system includes a digital joystick, or "joypad", on the left-hand side of one of its video displays, together with a group of four pushbutton switches on the opposite, right-hand side of the same video display.

Within such prior art systems, the system's users generally have no choice but to use one specific hand for joystick operation, and the other for pushbutton operation. For example, systems with a joystick positioned within the housing to the left of a video display require the operator to use their left hand for joystick operation. Likewise, systems with a joystick positioned within the housing to the right of a video display require the operator to use their right hand for joystick operation.

Notably, this fixed positioning of different user input devices may not comport with the preference of a given system user. Such preferences may arise based upon whether the user is left-handed or right-handed, or may simply reflect a preference of a particular user, irrespective of whether or not he or she is left or right handed. For example, a left-hand user may prefer to use a joystick with his or her right hand, and to operate a pushbutton switch with the left hand. Such a user may be forced to use their opposite hands, however, when using prior art systems having a joystick on the left hand side of the video display.

Accordingly, it is an object of the present invention to provide a computing device with a multi-function, repositionable controller assembly, having multiple user input devices.

It is another object of the present invention to provide a computing device having a multi-function, repositionable controller assembly which is user-configurable to serve as either a joystick or a pushbutton switch.

A further object of the present invention is to provide a computing device having a plurality of such multi-function, repositionable controller assemblies, each configurable as either a joystick or a pushbutton switch in accordance with the preference of a user.

These and other desirable characteristics of the present invention will become apparent in view of the present specification and drawings.

SUMMARY OF THE INVENTION

Figure 1:
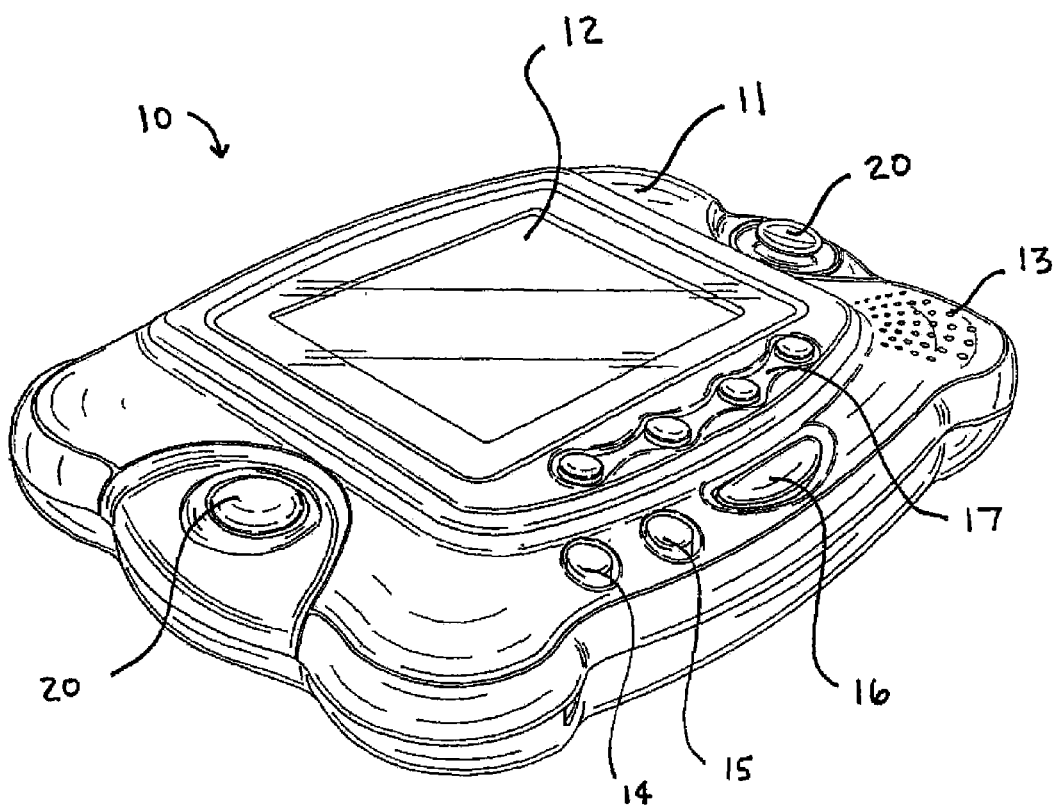
FIG. 1 is top right perspective view a portable computing device including two repositionable controller assemblies, according to a preferred embodiment of the invention.

An apparatus, such as a portable computing device, is disclosed as comprising a housing and at least one controller assembly carried by the housing. The controller assembly has a first user input device and a second user input device. Moreover, the controller assembly is rotatable from a first position to a second position. When the controller assembly is in the first position, operation of the first user input device is enabled and operation of the second user input device is inhibited. Likewise, when the controller is in the second position, operation of the second user input device is enabled and operation of the first user input device is inhibited.

In a preferred embodiment, the controller assembly is rotatable from the first position to the second position. The first user input device is concealed within the housing when operation of the first user input device is inhibited. Similarly, the second user input device is concealed within the housing when operation of the second user input device is inhibited.

Moreover, in a preferred embodiment, at least one of the first user input device and the second user input device comprises a joystick, such as a digital joystick. Further, the joystick may include its own, auxiliary pushbutton switch. Also, in a preferred embodiment, at least one of the first user input device and the second user input device comprises a pushbutton switch. In one embodiment, the device includes a locking mechanism for restricting rotation of the controller assembly when the mechanism is locked and permitting rotation of the controller assembly from a first position into a second position when the mechanism is unlocked. Additionally, the two controller assemblies are preferably connected to one another whereby both controller assemblies move in unison from a first position into a second position.

Preferably, the at least one controller assembly comprises two controller assemblies, and the apparatus is an electronic learning system.

DETAILED DESCRIPTION OF THE INVENTION

While this invention is susceptible of embodiment in many different forms, there are shown in the drawings and will be described in detail, one specific embodiment, with the understanding that the present disclosure is to be considered as an exemplification of the principles of the invention and is not intended to limit the invention to the embodiment illustrated.

The present portable computing device 10 is shown in FIG. 1 as comprising housing 11, color liquid crystal video display 12, and a plurality of pushbutton switches 14, 15 and 16, as well as pushbutton switch group 17. A speaker grill 13 allows sound to be emitted from a speaker carried within the housing. Two controller assemblies 20 are carried by the housing on opposing sides of video display 12. Each controller assembly includes two opposing user input devices, namely, a joystick (sometimes referred to as a joypad) and an pushbutton switch (shown oversized in the illustrated embodiment and sometimes referred to as a "fire" button, especially in video game applications). Moreover, each controller assembly is configurable, by repositioning the assembly via rotation about its horizontal axis, such that one its two user input devices is presented on the outer surface of housing 11 and available for use, while the other user input device is concealed within the housing and inhibited from use.

For example, and as shown in FIG. 1, the controller assembly 20 on the left-hand side of video display 12 is configured for use as a joystick, with the joystick user input device presented to the user and enabled for operation, while the pushbutton switch user input device is concealed within the housing and inhibited from operation. Conversely, as shown in FIG. 1, the controller assembly on the right-hand side of video display 12 is configured for use as a pushbutton switch, with the pushbutton switch user input device presented to the user and enabled for operation, while the joystick user input device is concealed within the housing and inhibited from operation.

Figure 2:
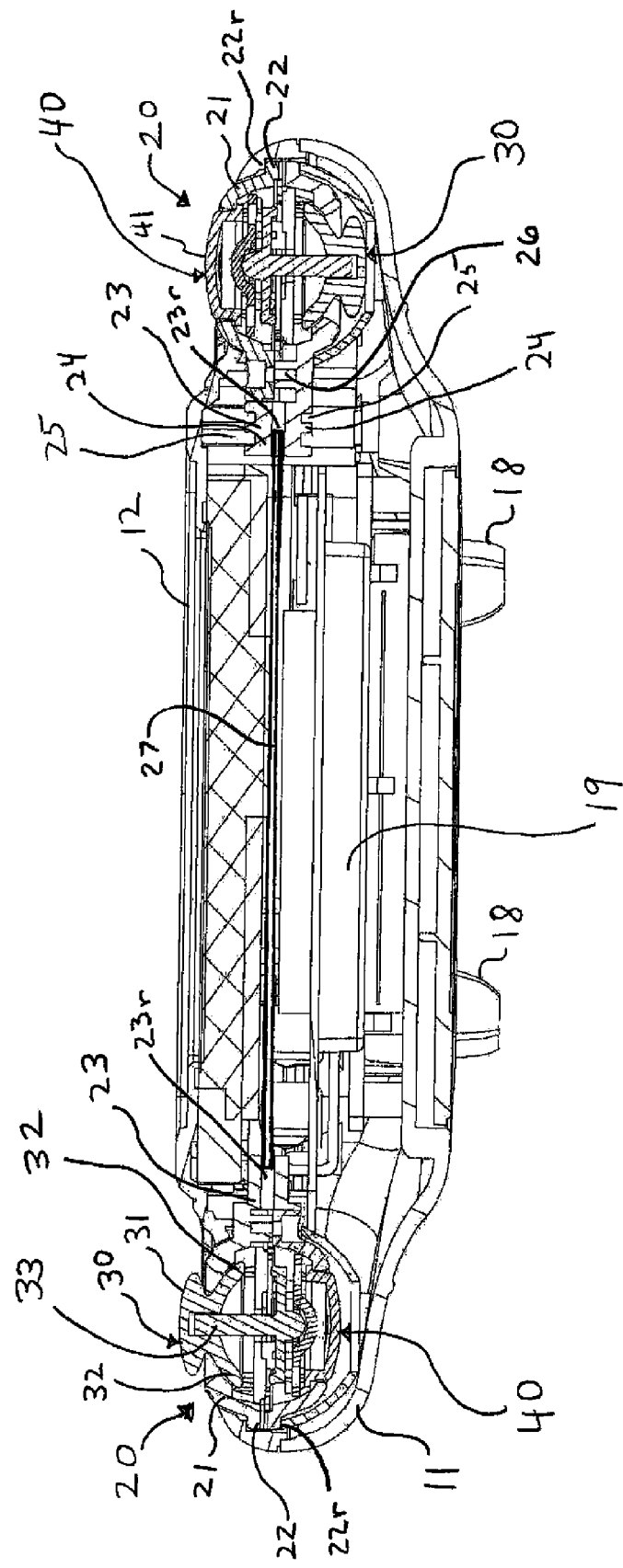
FIG. 2 is an elevation in partial section of the portable computing device of FIG. 1.

As shown in FIG. 2, the present portable computing device further includes footings 18 and expansion port 19. For electronic learning use, expansion port 19 will typically accept memory expansion cartridges storing educational learning software. For gaming use, expansion port 19 will typically accept expansion cartridges storing game or entertainment software. Expansion port 19 may alternatively comprise a disc player, such as a compact-disc or DVD disc player Each controller assembly 20 is shown in further detail in FIGS. 2 and 3 as comprising a generally spherical controller shell 21, with pin 22 and shaft 23 extending from opposing sides of a horizontal axis of shell 21. As shown in FIG. 2., pin 22 is rotatably carried within a corresponding interior recess 22r of housing 11. Shaft 23 further includes a recess 23r for accepting receipt of connecting rod 27 which serves to join the two controller shells 21 together. Shaft 23 further includes a series of grooves 24, which mesh with corresponding protrusions 25 extending from a boss within housing 11, so as to preclude horizontal movement of controller assembly 20 while, at the same time, permitting controller assembly 20 to rotate about its horizontal axis. A protruding stop member operably attached to shaft 23 contacts additional internal bosses attached to housing 11, setting the limits of rotation of controller assembly 20. In this manner, each controller assembly 20 may be rotated back and forth between two positions, over 180 total degrees of travel. Moreover, controller assembly 20 preferably releasably locks, or snap-fits into both of its opposing 180 degree positions. A spring loaded retractable locking pin, accessible from the underside of apparatus 10, is retractably positioned within opening 26 of shaft 23 and when inserted into opening 26 restricts rotation of controller assembly 20 and when retracted permits rotation.

Figure 3:
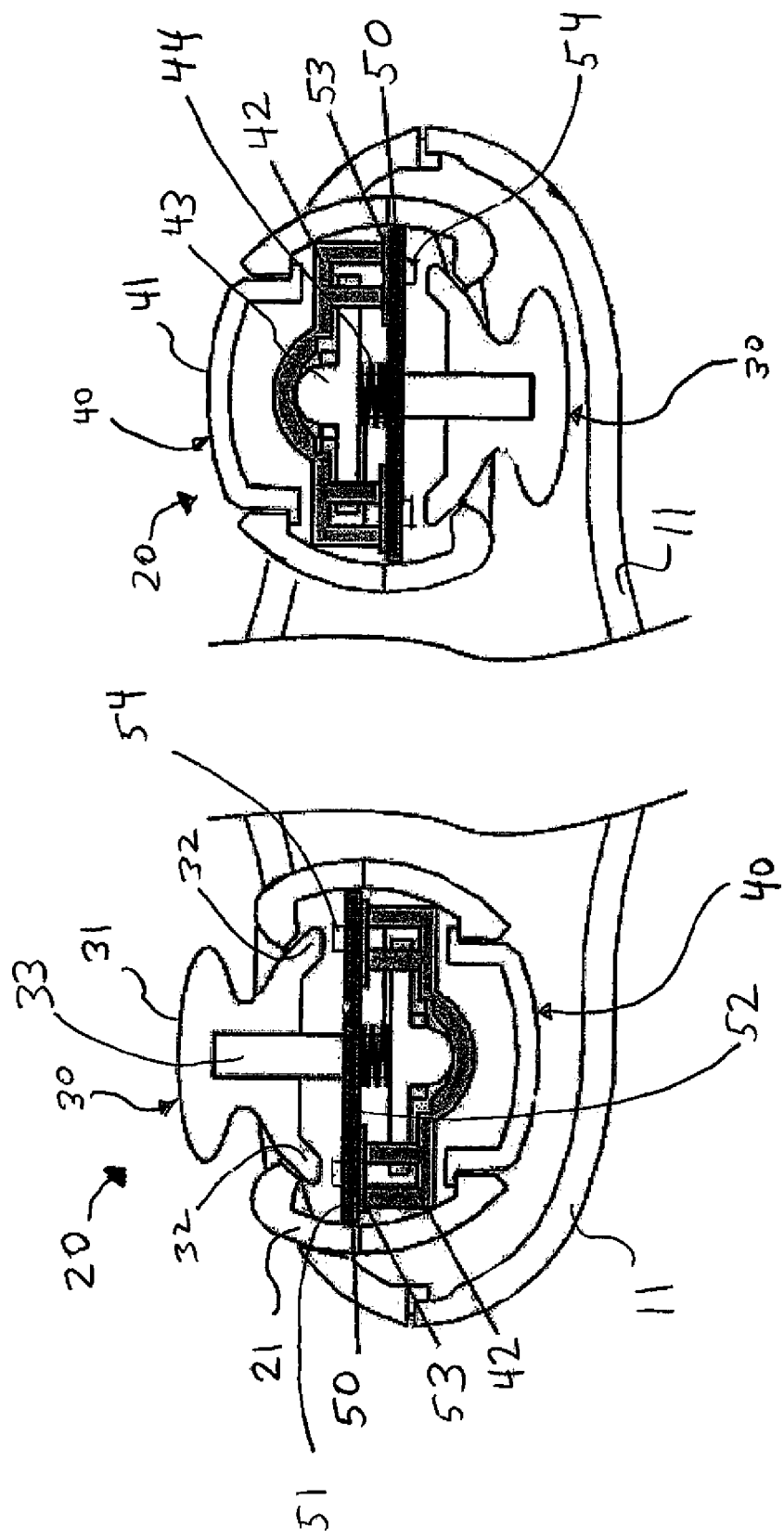
FIG. 3 is a simplified, fragmentary sectional view of the portable computing device showing, in particular, one controller assembly configured as a joystick and another controller assembly configured as a pushbutton switch.

As shown in FIGS. 2 and 3, each controller assembly 20 includes two user input devices: joystick 30 and pushbutton switch 40. Joystick 30 and pushbutton switch 40 are positioned on opposing sides of controller shell 21. Joystick 30 includes joystick handle 31, which, in turn, includes a knob-like proximal end protruding from controller shell 21, as well as a distal end having an annular contact region 32 carried within controller shell 21.

Joystick handle 31 is operably attached to resilient post 33, permitting the joystick handle to be momentarily deflected by the user from its at-rest, vertical position to a wide variety of off-center positions. This deflection from the at-rest, vertical position in turn causes portions of annular contact region 32 to come in contact with and depress one or more dome members 54, carried upon a first surface 51 of printed circuit board (PCB) 50. This, in turn, causes a conductor carried within the inner surface of the depressed dome member to come into electrical contact with a portion of first surface 51 of PCB 50, forming a contact closure.

Figure 4:
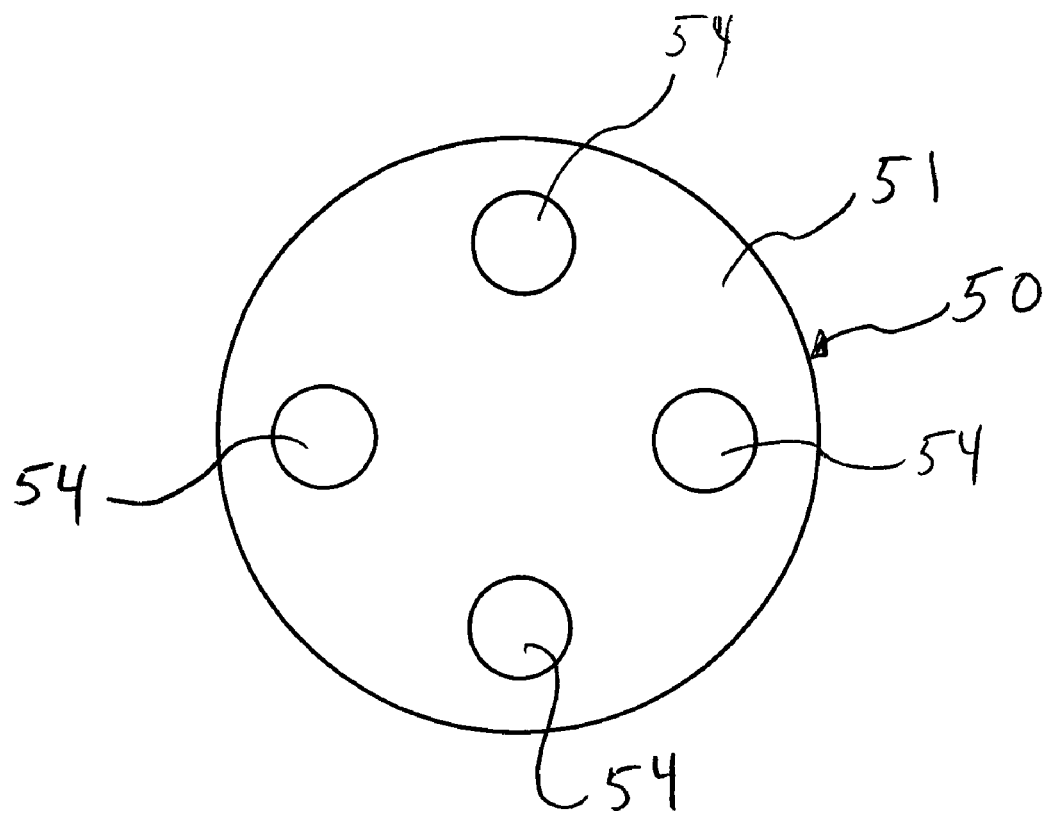
FIG. 4 is a simplified top plan view of the printed circuit board of the controller assembly.

Depending upon the angle of deflection of joystick handle 31, either one or two dome members 54, of the four total dome members carried by PCB 50 (as shown in FIG. 4) will be depressed. Depression of a single dome member is indicative of deflection of joystick handle 31 at orientations of approximately 90, 180, 270 or 360 degrees, depending upon the particular dome member that is depressed. Depression of two dome members simultaneously is indicative of deflection of joystick handle 31 at orientations of approximately 45, 135, 225, and 315 degrees, depending upon which two particular, adjacent dome members are depressed.

Moreover, resilient post 33 is sufficiently resilient to permit, in addition to momentary lateral deflection, momentary downward vertical depression of joystick handle 31. This, in turn, causes annular contact region 32 to simultaneously come in contact with and depress all four dome members 54 simultaneously. This, in turn, permits joystick 30 to further serve as an auxiliary pushbutton switch.

Joystick 30, as described above, is often referred to as a digital joystick, in that deflection of the joystick's handle, or "pad", results in the closure of one or more switches, which typically yields a somewhat inexact indication of the joystick's actual angle of deflection. Should a more exacting indication of the joystick's angle of deflection be desired for a particular application, an analog joystick, typically constructed from two potentiometers and indicating precise amounts of deflection of the joystick handle along the X and Y axes, respectively, may alternatively be employed.

As shown in FIGS. 2 and 3, pushbutton switch 40 includes button member 41, conductive bracket 42, conductive dome 43, and spring 44. Vertically depressing button member 41 compresses spring 44, and breaks the electrical contact between conductive dome 43 and conductive bracket 42. This break, in turn, is sensed by portions 53 of PCB 50 which are in electrical contact with conductive bracket 42.

As shown in FIG. 2, shaft 23 extending from controller shell 21 includes a longitudinal aperture, permitting cabling attached to PCB 50 (FIG. 3) to be coupled to an additional printed circuit card within housing 20. This, permits dedicated electronic circuitry, or a microprocessor's input port, to read the contact closure status of each dome member 54, as well as the contact closure status of pushbutton switch 40. This, in turn, permits circuitry or a microprocessor external to controller assembly 20 to determine the present position of joystick handle 31, including its degree of lateral deflection or its vertical depression when used as an auxiliary pushbutton switch, and to also determine whether pushbutton switch 40 is in its closed or open position.

As shown in FIGS. 2 and 3, the controller assemblies 20 are configured in a manner which may, for example, be preferred by a right-handed user. The controller assembly on the left-hand side of the video display is configured to operate as a joystick, with the joystick handle protruding vertically from the housing, and the pushbutton switch of this controller concealed within the housing. In this position, operation of this controller's joystick is enabled, and operation of this controller's pushbutton switch is disabled.

The controller assembly on the right-hand side of the video display is rotated 180 degrees about its horizontal axis, relative to the controller assembly on the left-hand side. This right-hand side controller is configured to operate as a pushbutton switch, with the button member protruding vertically from the housing, and the joystick handle of this controller concealed within the housing. In this position, operation of this controller's pushbutton switch is enabled, and operation of this controller's joystick is disable.

A left-hand user, for example, may prefer the opposite configuration of the two controller assemblies, and may choose to reconfigure each assembly by rotating each of them 180 degrees about their horizontal axes, to, in turn, configure the left-hand controller as a pushbutton switch and the right-hand controller as a joystick. Thus, the portable computing device may be rapidly configured for either left-handed or right-handed operation.

Moreover, depending upon the educational, entertainment, or other program being executed by the portable computing device, it may be desirable to have two joysticks, or two pushbutton switches, enabled for simultaneous operation. For such applications, both controller assemblies may be rotated into identical, rather than opposing configurations, such that two joysticks, or two pushbutton switches, are simultaneously presented to the user for operation.

The foregoing description and drawings merely explain and illustrate the invention and the invention is not limited thereto, as those skilled in the art who have the disclosure before them will be able to make modifications and variations therein without departing from the scope of the invention.

What is claimed is:

1. An apparatus comprising:
a housing; and
at least one controller assembly carried by the housing and having a first user input device and a second user input device, the controller assembly being movable from a first position to a second position, wherein, when the controller assembly is in the first position, operation of the first user input device is enabled and operation of the second user input device is inhibited, and when the controller is in the second position, operation of the second user input device is enabled and operation of the first user input device is inhibited,
wherein at least one of the first user input device and the second user input device comprises a joystick.

2. The invention according to claim 1, wherein the joystick comprises a digital joystick.

3. The invention according to claim 1, wherein the joystick further includes a pushbutton switch.

4. The invention according to claim 1, wherein at least one of the first user input device and the second user input device comprises a pushbutton switch.

5. The invention according to claim 1, wherein the at least one controller assembly comprises two controller assemblies.

6. The invention according to claim 1, wherein the apparatus is an electronic learning system.

7. The invention according to claim 1, wherein the apparatus further includes a locking mechanism for retaining the at least one controller assembly in position and preventing movement when the mechanism is in a locked position, and permitting the controller assembly to be moved from a first position into a second position when the mechanism is in an unlocked position.

8. An apparatus comprising:
a housing; and
at least one controller assembly carried by the housing and having a first user input device and a second user input device, the controller assembly being movable from a first position to a second position, wherein, when the controller assembly is in the first position, operation of the first user input device is enabled and operation of the second user input device is inhibited, and when the controller is in the second position, operation of the second user input device is enabled and operation of the first user input device is inhibited,
wherein the controller assembly is rotatable from the first position to the second position.

9. An apparatus comprising:
a housing; and
at least one controller assembly carried by the housing and having a first user input device and a second user input device, the controller assembly being movable from a first position to a second position, wherein, when the controller assembly is in the first position, operation of the first user input device is enabled and operation of the second user input device is inhibited, and when the controller is in the second position, operation of the second user input device is enabled and operation of the first user input device is inhibited,
wherein the first user input device is concealed within the housing when operation of the first user input device is inhibited.

10. The invention according to claim 9, wherein the second user input device is concealed within the housing when operation of the second user input device is inhibited.

11. An electronic learning apparatus comprising:
a housing;
a video display carried by the housing; and two controller assemblies carried by the housing and each having a first user input device and a second user input device, the controller assemblies each being movable from a first position to a second position, wherein, when each controller assembly is in the first position, operation of the first user input device is enabled and operation of the second user input device is inhibited, and when each controller is in the second position, operation of the second user input device is enabled and operation of the first user input device is inhibited.

12. The invention according to claim 11, wherein the apparatus further includes a locking mechanism for retaining the controller assemblies in their respective positions when the mechanism is in a locked position, and permitting the controller assemblies to be moved from the first position into the second position when the mechanism is in an unlocked position.

13. The invention according to claim 11, wherein the two controller assemblies are connected to one another whereby both controller assemblies move in unison from the first position into the second position.

* * * * *